(12) United States Patent
Sandelman

(10) Patent No.: US 6,223,543 B1
(45) Date of Patent: May 1, 2001

(54) EFFECTIVE TEMPERATURE CONTROLLER AND METHOD OF EFFECTIVE TEMPERATURE CONTROL

(75) Inventor: David Sandelman, Chatham, NJ (US)

(73) Assignee: Heat-Timer Corporation, Fairfiled, NJ (US)

( * ) Notice: Subject to any disclaimer, the term of this patent is extended or adjusted under 35 U.S.C. 154(b) by 0 days.

(21) Appl. No.: 09/334,760

(22) Filed: Jun. 17, 1999

(51) Int. Cl.[7] .................................................... F25D 17/06
(52) U.S. Cl. ............................ 62/93; 62/176.6; 73/335.01
(58) Field of Search ........................ 62/93, 176.1, 176.6, 62/186, 208; 236/44 C; 165/222, 230; 73/335.01

(56) References Cited

U.S. PATENT DOCUMENTS

| | | | |
|---|---|---|---|
| 4,257,238 | * 3/1981 | Kountz et al. ..................... 62/176.6 |
| 4,350,021 | * 9/1982 | Lundstrom ......................... 62/176.6 |
| 4,894,532 | 1/1990 | Peterson et al. .................... 2502/227 |
| 4,911,357 | 3/1990 | Kitamura ............................ 236/44 E |
| 4,984,433 | * 1/1991 | Worthington ...................... 62/176.6 |
| 5,062,276 | * 11/1991 | Dudley .............................. 62/176.6 |
| 5,139,344 | * 8/1992 | Mutter ................................ 374/28 |
| 5,303,561 | * 4/1994 | Bahel et al. ....................... 62/176.6 |
| 5,319,975 | 6/1994 | Pederson et al. .................. 73/335.01 |
| 5,346,129 | 9/1994 | Shah et al. ........................ 236/44 C |
| 5,482,371 | * 1/1996 | Nishizawa et al. ................... 374/20 |
| 5,598,715 | 2/1997 | Edmisten .......................... 62/176.6 |
| 5,699,276 | 12/1997 | Roos ................................. 364/514 A |
| 5,783,836 | * 7/1998 | Liu et al. ............................. 250/574 |
| 5,881,951 | * 3/1999 | Carpenter ........................... 236/44 A |

FOREIGN PATENT DOCUMENTS

| | | |
|---|---|---|
| 56-056548 | 5/1981 | (JP) . |
| 56-144347 | 11/1981 | (JP) . |
| 56-144348 | 11/1981 | (JP) . |
| 58-123038 | 7/1983 | (JP) . |
| 1-033457 | 2/1989 | (JP) . |

* cited by examiner

*Primary Examiner*—William E. Tapolcai
(74) *Attorney, Agent, or Firm*—Levisohn, Lerner, Berger & Langsam

(57) ABSTRACT

A control system for a cooling system for reducing humidity levels in a gas such as ambient air is provided. The cooling unit includes at least one of a compressor and a chiller, and cooling coils are connected to the cooling unit. A fan blows the gas onto the cooling coils. A fan speed controller is connected to the fan and variably controls the speed of the fan. A dry bulb temperature sensor is in thermal communication with the gas and connected to the controller, and a moisture sensor is in communication with the gas and connected to the controller. The speed of the fan is determined by the controller based on signals received from the dry bulb temperature sensor and the moisture sensor. By varying the speed of the fan, the moisture content of the gas can be modified much more precisely than by conventional air conditioning methods.

28 Claims, 4 Drawing Sheets

EFFECTIVE TEMPERATURE CONTROLLER AND METHOD OF EFFECTIVE TEMPERATURE CONTROL

BACKGROUND OF THE INVENTION

1. Field of the Invention

This invention relates to air conditioning systems and more particularly to air conditioning systems that control humidity levels in the air. It is also applicable to removing or reducing the moisture content from other gases.

2. Description of Related Art

Air-conditioning, the cooling of the air of indoor spaces, has been known for decades. Residential or home air-conditioning is typically controlled by a thermostat that solely measures the dry bulb temperature or sensible heat of the air being conditioned.

However, one of the main objectives of air-conditioning is to reduce the moisture content or relative humidity of the air as well. Depending on the temperature and humidity, controlling an air-conditioning system based on dry bulb temperature alone may produce uncomfortable conditions and use energy inefficiently. A system that does not effectively dehumidify the air may leave the conditioned air cold but damp; for example, it is more comfortable to maintain a room at 75° F. at low humidity conditions than it is to cool a room to 68° F. but allow humidity levels to remain high.

One proposed solution has been to add a relative humidity sensor to the typical thermostat of an air-conditioning system and then control the air-conditioner to hold relative humidity within a predetermined range. There are several drawbacks to such a system. For one, humidity sensors that directly measure relative humidity are generally inaccurate and slow to respond to changes in ambient conditions. A problem may also result with such a system in that the relative humidity of the enclosed air will rise as it is cooled provided one remains above the dew point. Relative humidity is a function of both the amount of water vapor per volume of air and its dry-bulb temperature, specifically the ratio of the partial pressure of the water vapor in the air to the vapor pressure of saturated steam at that pressure. Since the vapor pressure of saturated steam drops rapidly with temperature, a small amount of water vapor at a lower temperature can result in 100% relative humidity. It is possible to have a situation where the humidity control calls for further dehumidification, the temperature drops, and the relative humidity rises.

Air-conditioning systems are sized to reduce both the sensible and latent heat at the design point. This is a point where the known maximum load may occur only 5–10% of the time during the cooling season based on local climatological weather data and utilization of the space. During periods when the sensible heat load is less than the design point and the relative humidity is high, a dry bulb thermostat will only need to run the air-conditioner for a short period of time before the space reaches the desired dry bulb set point and the thermostat is satisfied. This short run time does not allow the air-conditioner sufficient time to remove the required amount of moisture from the air and therefore the air will be cool and damp, an uncomfortable condition.

FIG. 1 shows the typical airflow in an air-conditioning system. The incoming air stream 1 is pulled through a cooling coil 2 by a fan 3 and leaves as cooler air 4. Moisture will be removed from the incoming air stream 1 if the coil temperature 2 is at or below the point of condensation (dew point) of the incoming air 1 and will leave as a dehumidified air 4. A thermostat 5 measures the dry bulb temperature by means of a temperature sensor 7 in the air of the conditioned space. Once the dry bulb air temperature is cooled to the desired point, the thermostat turns off the compressor or cooler 6 and stops the process of removing sensible heat and moisture. The occupant of the conditioned space may have an option depending on the model of thermostat as to whether or not the thermostat 5 will stop the fan 3 from moving air or continue to run the fan and circulate air in the conditioned space during the period when no cooling is required. By controlling the cooler 6 based on the dry bulb temperature sensor 7 connected to the thermostat 5, there may be periods when the conditioned space is uncomfortable due to high levels of humidity for the given set point of the thermostat 5.

SUMMARY OF THE INVENTION

Accordingly, it is an object of the invention to provide an air conditioning system that can efficiently reduce the humidity in the air in an enclosed area without overcooling the air.

It is another object of the invention to provide an air conditioning system that will provide comfortable ambient conditions in an energy efficient manner.

It is another object of the invention to provide an air conditioning system having an accurate inexpensive moisture sensor.

These and other objects are accomplished by the invention which includes a cooling system having a chiller/compressor/cooler, cooling coils, and a fan blower. The cooling system has a dry bulb temperature sensor and a moisture sensor. Both sensors are connected to a controller which controls the speed of the fan. The moisture sensor determines the level of moisture in the space to be conditioned and sends a signal to a controller. Based on the signals received from the dry-bulb temperature sensor and the moisture sensor, the controller controls the speed of the fan.

By varying the fan speed, the invention can vary the amount of moisture in the air as well as the temperature. At lower fan speeds, air passes over the cooling coils more slowly, there is more contact with the cooling coils, and thus there is more dehumidification and more cooling occurring; however, at lower speeds, a smaller volume of air is being conditioned. This results in a conditioned space having warmer dry bulb temperature but lower humidity than if the fan speed were faster. That is, at higher fan speeds, a greater volume of air is conditioned, however less moisture per volume is removed therefrom, resulting in a cooler but more humid space.

The invention further includes the method and apparatus by which moisture levels are detected. The invention uses a chilled mirror approach. A mirror is provided in thermal communication with the cooling coils of the air conditioner. Thus, if moisture is condensing on the cooling coils, then moisture will condense on the mirror as well. The formation of condensate means that the cooling coils (and mirror) are below the dew point of the room. A heater is provided in thermal communication with the mirror. When the heater is activated, the temperature of the mirror rises. At some point, the temperature of the mirror will rise above the dew point of the room, and the condensate will disappear from the mirror. The disappearance of the condensate can be detected by a photosensor, and the amount of heat needed to make the condensate disappear is easily determined. In this fashion, i.e., raising the mirror to the dew point of the room, the dew point can be determined, and the fan speed of the system can be altered accordingly.

DETAILED DESCRIPTION OF THE PREFERRED EMBODIMENTS

Increased levels of moisture removal may be accomplished during periods of reduced sensible heat load by reducing the volume of air passing over the cooling coil. The reduced flow of air across a cooling coil changes the ratio of sensible and latent heat removal with an increase in the capacity of the latent component.

Effective Temperature (ET*) combines temperature and humidity into a single index, so two environments with the same ET* should evoke the same comfort even thought they have different temperatures and humidities. A room at 78° F. with a low relative humidity will be just as comfortable as, a room at 70° F. with a high relative humidity. The low humidity in the 78° F. room allows a person's natural cooling system in the form of evaporation of moisture off the skin to work more efficiently. In addition, the amount of energy required in cooling a room to 78° F. is less than the energy required to cool a room to 70° F. In order to accomplish effective temperature control, both dry bulb temperature and the amount of moisture in the air must be known.

Figure 3:
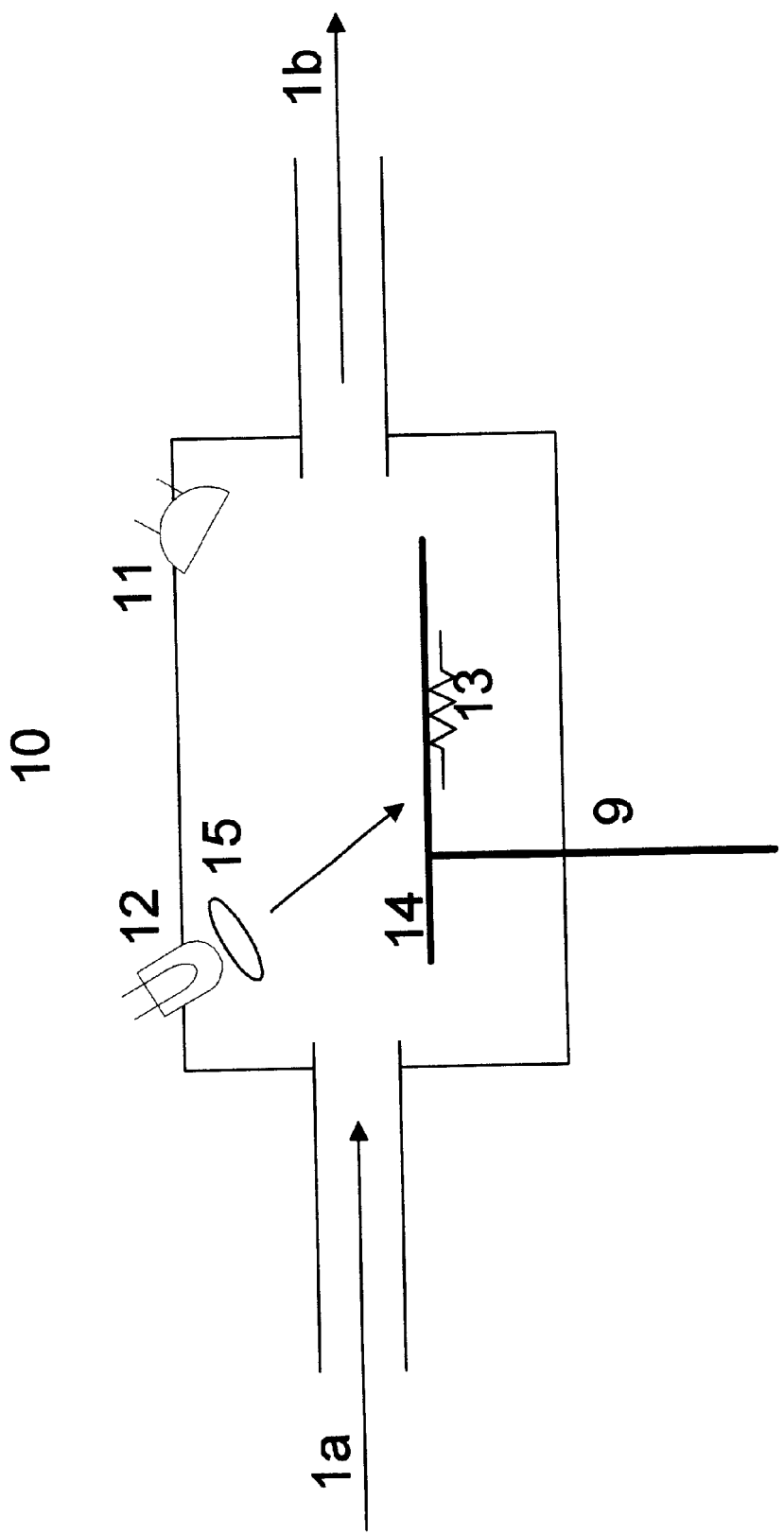
FIG. 3 is a schematic of a moisture sensor according to the present invention.
Figure 4:
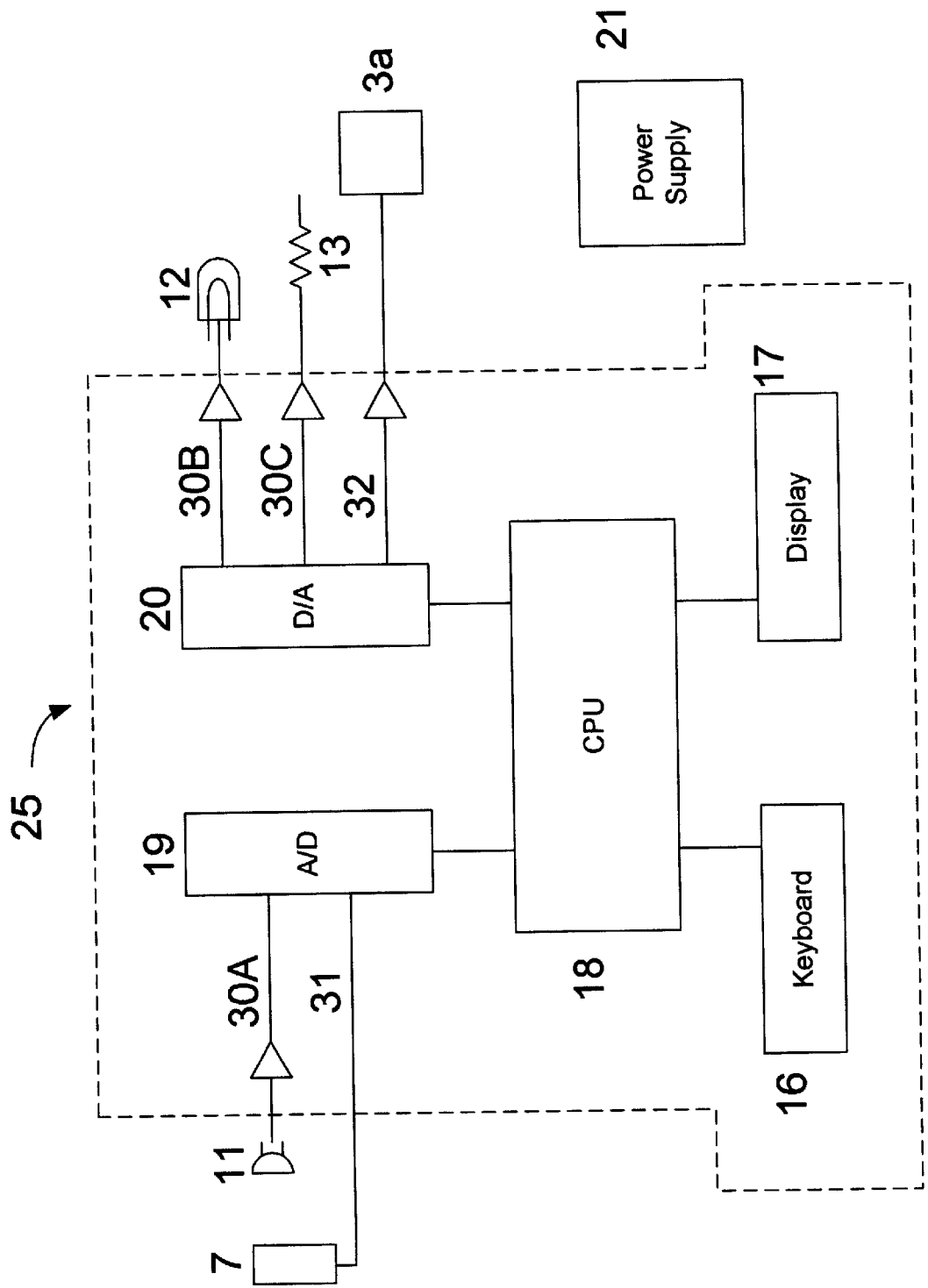
FIG. 4 is a electrical schematic of the air conditioning system according to the present invention showing the controller in greater detail.

The invention will now be described with reference to the attached FIGS. 2–4. Although the invention is described as being an air conditioning system for use in conditioning indoor ambient air, the invention is also applicable for removing or reducing the moisture content of other gases in industrial applications.

Figure 1:
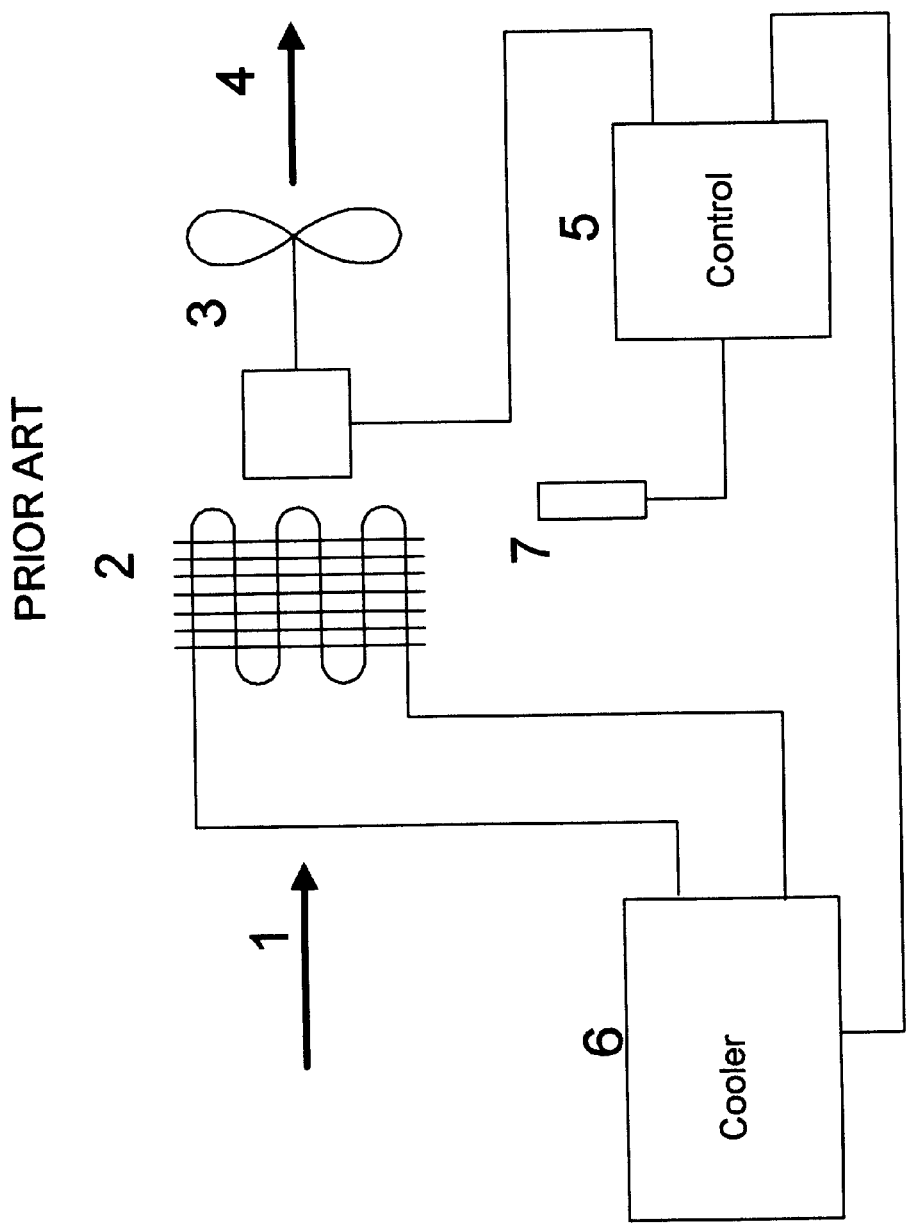
FIG. 1 is a schematic of a conventional air conditioning system.
Figure 2:
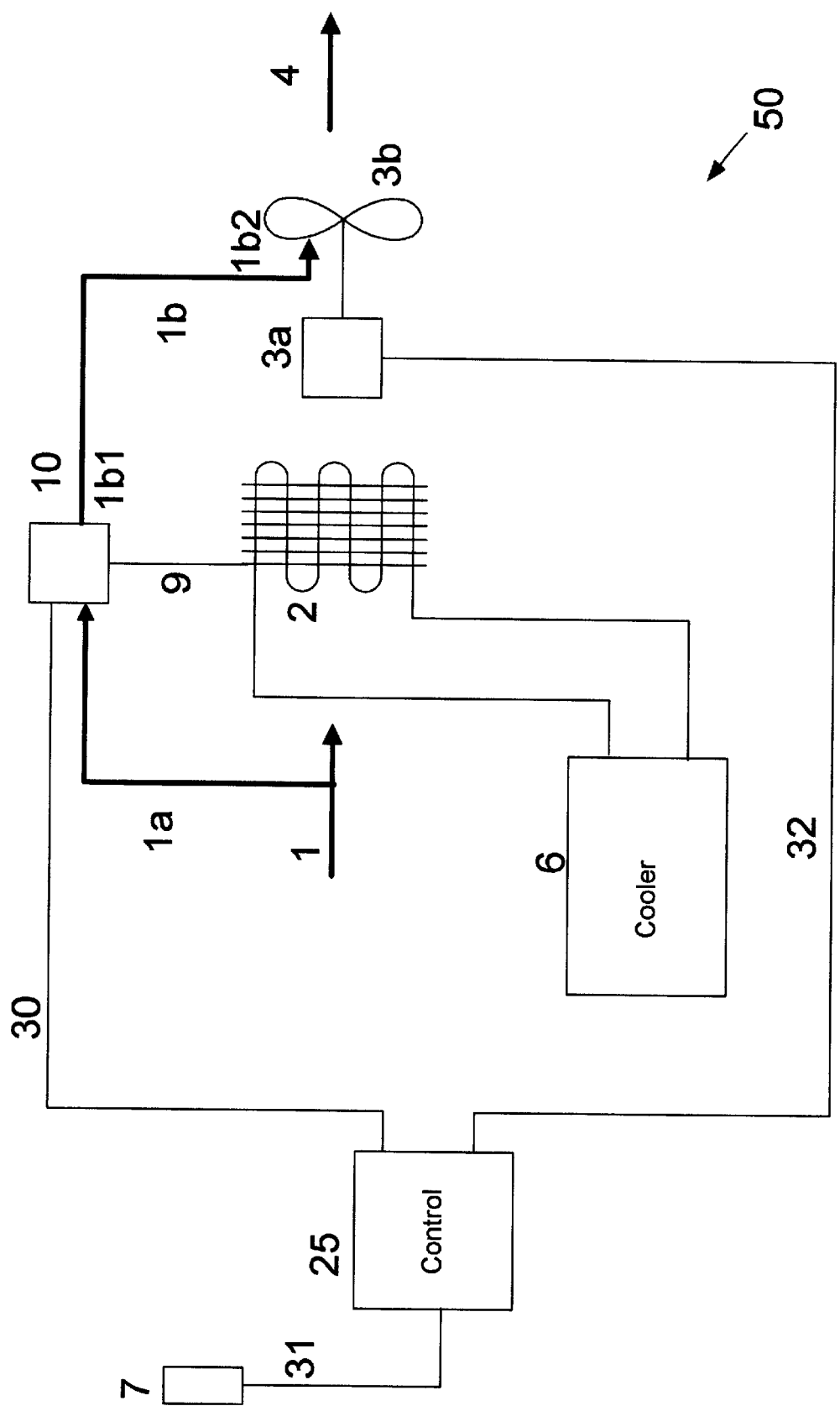
FIG. 2 is a schematic of an air conditioning system according to the present invention.

As shown in FIG. 2, air conditioning system 50 addresses both the dry bulb temperature and the moisture content of the air in the conditioned space. During periods when the incoming air 1 has a low level of sensible heat but a high level of humidity it would be desirable to alter the cooling coils 2 sensible to latent heat capacity ratio. This can be accomplished by running the fan 3b at a reduced speed. Reducing the volume of air that moves across the coil 2 alters the latent heat to sensible heat ratio, increasing the capacity to remove moisture while reducing the capacity to lower the amount of sensible heat in the air. Air passage 1a delivers air from the conditioned space to a moisture sensor 10 that is shown in detail in FIG. 3. The movement of air through the moisture sensor is caused by the low air pressure present at the back of the fan 3b on the outlet air passage 1b of the moisture sensor 10. Passage 1b has two ends; one end 1b1 receives air from moisture sensor 10, and the other end 1b2 is in communication with the rear of fan 3b. The controller 25 receives a signal from the moisture sensor 10 via line 30 that contains the level of moisture present in the conditioned space as sampled from the incoming air stream 1. The controller 25 also monitors a dry bulb temperature sensor 7 in the conditioned space via line 31. Based on the signals received from dry bulb temperature sensor 7 and moisture sensor 10, controller 25 can vary the fan speed of fan 3 by sending it signals via line 32. The preferred moisture sensor is shown in FIG. 3 and measures moisture content in the air using a chilled mirror system. Chilled mirror systems used for the measurement of the dew point of a gas are well known from prior art; however, the inventive moisture sensor 10 is novel owing to the thermal connection of the mirror to the cooling coil 2 and the use of heater 13, as will be described below. The invention utilizes the temperature of the chilled cooling coil, which is commuted through a thermal conductor 9 to the surface of a mirror 14. If the temperature of the coil is below the dew point of the incoming air 1a, condensation will form on the mirror. If the dew point temperature is below that of the coil, no condensation will form on the mirror despite the mirror 14 being thermally connected to cooling coils 2. The lack of condensation on the mirror 14 indicates that the cooling coil 2 will be unable to reduce the moisture content in the space being conditioned and will only be able to reduce the sensible heat portion of the air in the room. Condensation is detected on the mirror by directing a source of light 12 via a lens 15 to the sensing mirror 14 and measuring the amount of reflected light with a photosensor 11. The actual dew point can be determined by increasing the temperature of the mirror with a heating element 13 to the point at which the condensation clears from the mirror as detected by the change in reflected light sensed by the photosensor 11. The amount of heat output by the heater 13 and the level of reflected light are both controlled and measured by controller 25. With this information, controller 25 can determine the temperature at which the mirror unfogs, i.e., the actual dew point of the incoming air 1. With the dew point known and the dry bulb temperature measured by the temperature sensor 7, an Effective Temperature index can be determined by the following equation:

$$ET^* = t_0 + wi_m LR(p_a - 0.5 p_{ET^*,s}) \quad (1)$$

where
ET*=Effective Temperature
$t_0$=temperature, operative
w=skin wetness
$i_m$=vapor permeation total
LR=Lewis ratio
$p_a$=water vapor pressure, ambient
$p_{ET^*,s}$=water vapor pressure, saturated at ET*.

This equation is the ASHRAE standard for Effective Temperature (ASHRAE Fundamentals 1997, Chapter 8, Section 8.6, Equation (33)) and covers a broad range of different applications; for example, the respective temperature and humidity levels for comfort in a library, health club exercise room, and locker rooms are very different. That is where 'skin wetness' and 'vapor permeation' come into play. For typical domestic air conditioning applications, average values can be selected for normal clothing in normal activities in the house. If the occupant is not comfortable he/she may adjust the ET set point up or down.

Because the operation of moisture sensor 10 is controlled by controller 25, and because controller 25 receives information from moisture sensor 10, a feedback loop is present in the system. Line 30 of FIG. 2 should include several components, as will be described herein. As shown in FIG. 4, controller 25 includes analog/digital converter 19 for receiving signals from temperature sensor 7 via line 31 and photosensor 11. Controller 25 also includes digital/analog converter 20 for sending signals to light source 12 via line 30B, mirror heater 13 via line 30C, and fan motor 3a via line 32. Keyboard 16 and display 17 are provided to allow an operator to interface with the system. Power supply 21 is provided to power the entire system.

Relative levels of humidity between 40% and 60% have been determined to be the optimum range for both comfort and health. Standard Effective Temperature (SET*) is based on a relative humidity (RH) level of 50%. In addition, relative humidity levels maintained below 60% have been shown to reduce the growth of mold. This is important to people who are sensitive or allergic to mold spores when they come in contact with them.

In operation, the invention functions as follows. The occupant of the room where the invention is installed would set an initial dry bulb temperature set point on the controller 25 by means of keyboard 16, a series of touch switches (not shown), or other similar data entering means. Alternatively, the operator of the system will set a "comfort level", i.e., Effective Temperature, via the same input means as above, and the CPU 18 will determine from that ET set point what a desirable dry bulb temperature would be. The comfort level may be expressed on a unitless numerical scale of 0–10 for example, on an conographic or pictorial scale, or any other convenient way of expressing different degrees of comfort. In any case, CPU 18 will vary the speed of motor 3a of fan 3 in order to achieve the desired dry bulb set point. Dry bulb temperature is monitored by sensor 7, and CPU 18 determines if the set point has been reached.

Once the set point has been achieved, controller 25 sends a signal via line 30B to activate light source 12 (alternatively, light source 12 can be continuously on). All the while, mirror 14 is being cooled by cooling coils 2 via thermal conductor 9. If there is no condensation on mirror 14, photosensor 11 detects light from light source 12 and indicates to CPU 18 that the dew point of the ambient air is below the temperature of the cooling coils 2, and thus the system cannot reduce the moisture content of the ambient air. If there is condensation on mirror 14, photosensor 11 will either detect a reduced amount of light or no light from light source 12 reflected off of mirror 14. Photosensor 11 sends this information to controller 25 via line 30A. Based on this signal, CPU 18 determines that heater 13 must be activated to clear mirror 14 and does so by sending a signal via line 30C. Heater 13 generates heat until mirror 14 clears of condensate. When photosensor 11 detects that mirror 14 is clear (because it detects the light reflected therefrom), a signal is sent to controller 25 via line 30A, and heater 13 is deactivated by controller 25 via line 30C. CPU 18 is able to calculate the dew point of the ambient air based on the amount of energy delivered to the heater. The amount of energy delivered to the heater can be controlled via a number of different means, such as varying the voltage across the heater, varying the current supplied to the heater, varying the duration of time the heater is on, and the like. Alternatively, a separate temperature sensor (not shown) can be used to measure the mirror temperature directly.

CPU 18 will have the value of the dew point of the space by means of the above-described system. An ET* can now be determined, and the fan 3 will be allowed to run at a minimum speed if it is still necessary to reduce the RH to an acceptable value. As the dew point of the space is reduced, the dry bulb temperature of the space will be allowed to rise in order to keep the ET* constant. There is thus a feedback loop that includes the moisture sensor, the temperature sensor, and the controller.

Having described the invention with regard to specific embodiments, it is to be understood that the description is not meant as a limitation excluding such further variations or modifications as may be apparent or may suggest themselves to those skilled in the art. It is intended that the present invention cover such variations and modifications as fall within the scope of the appended claims. For example, the above description indicates that the mirror in the moisture sensor is in constant thermal communication with the cooling coils. However, the thermal conductor that connects the two may be selectably disengageable for those periods of time when the moisture sensor is not being used. Similarly, the dry bulb and moisture sensors may be employed to monitor the quality of the room air (or other gas) continuously or intermittently. Also, the specification makes reference to a cooler; this can include any type of cooling device, such as a regular Freon compressor, a hydronic chiller using water, or the like. Additionally, the above description mentions that the CPU can determine if the dew point of the air is below the temperature of the cooling coils and thus cannot be further reduced in humidity. An indicator of this condition can be made as an optional component of display 17 or as a separate warning light. Display 17 can be made to indicate all types of relevant data in text or graphical format, such as temperature, relative humidity, dew point, the change of any of these data over time, or the like.

What is claimed is:

1. A cooling system for reducing humidity levels in a gas, comprising:

a cooling unit, said cooling unit including at least one of a compressor and a chiller;

cooling coils connected to said cooling unit;

a fan blowing the gas onto said cooling coils;

a fan speed controller connected to said fan, said controller variably controlling a speed of said fan;

a dry bulb temperature sensor in thermal communication with the gas, electrically connected to said controller and sending first signals to said controller; and a moisture sensor in communication with the gas, electrically connected to said controller and sending second signals to said controller, wherein said speed of said fan is determined by said controller based on said first and second signals, wherein said moisture sensor comprises:

a cooled mirror in thermal communication with said cooling coils, said cooling coils cooling said mirror;

a heater connected to said controller and in thermal communication with said cooled mirror;

a light source disposed near said mirror, said light source shining light onto said mirror;

a photosensor connected to said controller and disposed near said mirror adapted to detect the light shined from said light source and reflected by said mirror, said photosensor sending said second signals to said controller, wherein if condensation forms on said mirror, said photosensor will not detect a full amount of the light shined from said light source.

2. A cooling system according to claim 1, wherein said fan speed is controlled by a feedback loop including said dry bulb temperature sensor, said moisture sensor, and said controller.

3. A cooling system according to claim 1, wherein the gas is the ambient air of a room.

4. A cooling system for reducing humidity levels in a gas, comprising:

a cooling unit, said cooling unit including at least one of a compressor and a chiller;

cooling coils connected to said cooling unit;

a fan blowing the gas onto said cooling coils;

a fan speed controller connected to said fan, said controller variably controlling a speed of said fan;

a dry bulb temperature sensor in thermal communication with the gas, electrically connected to said controller and sending first signals to said controller; and a moisture sensor in communication with the gas, electrically connected to said controller and sending second signals to said controller, wherein said speed of said fan is determined by said controller based on said first and second signals, wherein said moisture sensor comprises;

a cooled mirror;

a heater connected to said controller and in thermal communication with said cooled mirror;

a light source disposed near said mirror, said light source shining light onto said mirror;

a photosensor connected to said controller and disposed near said mirror adapted to detect the light shined from said light source and reflected by mirror, said photosensor sending said second signals to said controller, wherein if condensation forms on said mirror, said photosensor will not detect a full amount of tie lit shined from said light source wherein said controller comprises:

an analog-to-digital converter receiving said first signals from said dry bulb temperature sensor and said second signals from said photosensor;

a digital-to-analog converter sending third signals to said heater and fourth signals to said fan; and a central processing unit (CPU) connected between said analog-to-digital converter and said digital-to-analog converter, said CPU determining the dew point of the gas based on the first and second signals and controlling said heater and said fan speed via said third and fourth signals.

5. A cooling system according to claim 4, further comprising input means for enabling a user to enter a dry bulb temperature set point, said input means connected to said CPU.

6. A cooling system according to claim 5, wherein said CPU includes logic to calculate an effective temperature of the gas based on said first and second signals and said set point.

7. A cooling system according to claim 6, wherein said CPU includes logic performing the following equation:

$$ET^*=t_0+wi_mLR(p_a-0.5p_{ET^*,s}).$$

8. A control system for a cooling system for reducing humidity levels in a gas, the cooling system having a cooling unit, the cooling unit including at least one of a compressor and a chiller, cooling coils connected to the cooling unit, and a fan blowing the gas onto the cooling coils, comprising:

fan speed controller connected to the fan, said controller variably controlling a speed of the fan;

a dry bulb temperature sensor in thermal communication with the gas, electrically connected to said controller and sending first signals to said controller; and a moisture sensor in communication with the gas, electrically connected to said controller and sending second signals to said controller;

wherein said speed of the fan is determined by said controller based on said first and second signals;

wherein said moisture sensor comprises;

a cooled mirror in thermal communication with the cooling coils, the cooling coils cooling said mirror;

a heater connected to said controller and in thermal communication with said cooled mirror;

a light source disposed near said mirror, said light source shining light onto said mirror;

a photosensor concerted to said controller and disposed near said mirror adapted to detect the light shined from said light source and reflected by said mirror, said photosensor sending said send signals to said controller, wherein if condensation forms on said mirror, said photosensor will not detect a full amount of the light shined from said light source.

9. A control system according to claim 8, wherein said fan speed is controlled by a feedback loop including said dry bulb temperature sensor, said moisture sensor, and said controller.

10. A control system according to claim 8, wherein the gas is indoor ambient air.

11. A control system for a cooling system for reticence humidity levels in a gas, the cooling system having a cooling unit, the cooling unit including at least one of a compressor and a chiller, cooling coils connected to the cooling unit, and a fan blowing the gas onto the cooling coils, comprising:

a fan speed controller connected to the fan, said controller variably controlling a speed of the fan:

a dry bulb temperature sensor in thermal communication with the gas, electrically connected to said controller sending first signals to said controller; and a moisture senor in communication with the gas, electrically connected to said controller and sending second signals to said controller, wherein said speed of the fan is determined by said controller based on said first and second signals, wherein said moisture sensor comprises:

a cooled mirror;

a heater connected to said controller and in thermal communication with said cooled mirror;

a light source disposed near said mirror, said light source shining light onto said mirror;

a photosensor connected to said controller and disposed near said mirror adapted to detect the light shined from said light source and reflected by said mirror, said photosensor sending said second signals to said controller, wherein if condensation forms on said mirror, said photosensor will not detect a full amount of the light suicide tot said light source, and wherein said controller comprises:

an analog-to-digital converter receiving said first signals from said dry bulb temperature sensor and said second signals from said photosensor;

a digital-to-analog converter sending third signals to said heater and fourth signals to said fan; and a central processing unit (CPU) connected between said analog-to-digital converter and said digital-to-analog converter, said CPU determining the dew point of the gas based on the first and second signals and controlling said heater and said fan speed via said third and fourth signals.

12. A control system according to claim 11, further comprising input means for enabling a user to enter a dry bulb temperature set point, said input means connected to said CPU.

13. A control system according to claim 12, wherein said CPU includes logic to calculate an effective temperature of the gas based on said first and second signals and said set point.

14. A control system according to claim 13, wherein said CPU includes logic performing the following equation:

$$ET^* = t_0 + wi_m LR(p_a - 0.5 p_{ET^*,s}).$$

15. A method of conditioning a gas via a cooler, cooling coils, and a fan, comprising the steps of:
   detecting the dry bulb temperature of the gas with a dry bulb temperature sensor;
   determining the moisture content of the gas via a moisture sensor;
   controlling fan speed based on the detected dry bulb temperature and the determined moisture content via a controller; and
   blowing the gas over the cooling coils via the fan,
   wherein said determining step comprises the step of using a chilled mirror comprises the stems of:
   chilling the mirror via thermal communication with the cooling coils;
   shining light onto the mirror via a light source;
   detecting if light is reflected off of the mirror via a photosensor; and
   heating the mirror via a heater if light is not detected by the photosensor.

16. A method according to claim 15, further comprising the steps of: sending first signals to the controller from the dry bulb temperature sensor; and sending second signals to the controller from the moisture sensor.

17. A method according to claim 15, further comprising the steps of: sending first signals to the controller from the dry bulb temperature sensor; sending second signals to the controller from the photosensor; and sending third signals to the heater from the controller.

18. A method according to claim 15, further comprising the steps of:
   determining how much energy is delivered to the heater when the heater is activated via a CPU in the controller;
   calculating the dew point of the gas via the CPU;
   calculating an optimal fan speed based on the dry bulb temperature and the dew point; and
   controlling the fan speed to the optimal fan speed via signals from the controller to the fan.

19. A method according to claim 18, wherein in said controlling step includes the step of calculating an effective temperature (ET) from the detected dry bulb temperature and the determined moisture content of the gas.

20. A method according to claim 19, wherein said calculating step is performed according to the following equation:

$$ET^* = t_0 + wi_m LR(p_a - 0.5 p_{ET^*,s}).$$

21. A method according to claim 15 wherein the gas being conditioned is indoor ambient air.

22. A method according to claim 15, said heating step comprising the step of controlling an amount of energy delivered to the heater.

23. A method according to claim 22, said controlling an amount of energy step comprising at least one of the following steps:
   varying a voltage across the heater;
   varying a current supplied to the heater; and
   varying a duration of time the heater is activated.

24. A method according to claim 18, wherein said CPU calculates the dew point of the gas by the amount of energy delivered to the heater and the dry bulb temperature.

25. A method of conditioning a gas via a cooler, cooling coils, and a fan, comprising the steps of:
   detecting the dry bulb temperature of the gas with a dry bulb temperature sensor;
   determining the moisture content of the gas via a moisture sensor;
   controlling fan speed based on the detected dry bulb temperature and the determined moisture content via a controller;
   blowing the gas over the cooling coils via the fan;
   sending first signals to the controller from the dry bulb temperature sensor;
   sending second signals to the controller from the photosensor;
   sending third signals to the heater from the controller;
   determining how much energy is delivered to the heater when the heater is activated via a CPU in the controller;
   calculating the dew point of the gas via the CPU;
   calculating an optimal fan speed based on the dry bulb temperature and the dew point; and
   controlling the fan speed to the optimal fan speed by sending fourth signals from the controller to the fan.

26. A method according to claim 25, wherein said CPU calculates the dew point of the gas by the amount of energy delivered to the heater and the dry bulb temperature.

27. A method of conditioning a gas via a cooler, cooling coils, and a fan, comprising the steps of:
   determiming the dry bulb temperature of the gas with a dry bulb temperature sensor;
   detecting the moisture content of the gas via a moisture sensor;
   controlling fan speed based on the detected dry bulb temperature and the determined moisture content via a controller; and
   blowing the gas over the cooling coils via the fan,
   wherein said controlling step includes the step of calculating an effective temperature (ET) from the detected dry bulb temperature and the determined moisture content of the gas.

28. A method according to claim 27, wherein said calculating step is performed according to the following equation:

$$ET^* = t_0 + wi_m LR(p_a - 0.5 p_{ET^*,s}).$$

* * * * *

UNITED STATES PATENT AND TRADEMARK OFFICE
CERTIFICATE OF CORRECTION

PATENT NO. : 6,223,543 B1
DATED : May 1, 2000
INVENTOR(S) : David Sandelman

It is certified that error appears in the above-identified patent and that said Letters Patent is hereby corrected as shown below:

Title page,
Below "Filed June 17, 1999" insert

-- Related U.S. Application Data
Provisional Application No. 60/100,356, filed September 15, 1998 --;

Column 1,
Line 4, insert

-- RELATED APPLICATIONS
This application claims priority from U.S. Provisional Patent Applications No. 60/100,356 filed, September 15, 1998. --

Signed and Sealed this

Eighth Day of January, 2002

*Attest:*

JAMES E. ROGAN
*Attesting Officer*     *Director of the United States Patent and Trademark Office*